United States Patent [19]

Gaiser

[11] E Re. 31,080

[45] Reissued Nov. 16, 1982

[54] MASTER CYLINDER

[75] Inventor: Robert F. Gaiser, Stevensville, Mich.

[73] Assignee: The Bendix Corporation, Southfield, Mich.

[21] Appl. No.: 261,356

[22] Filed: May 7, 1981

Related U.S. Patent Documents

Reissue of:

[64] Patent No.: 4,249,381
Issued: Feb. 10, 1981
Appl. No.: 110,151
Filed: Jan. 7, 1980

U.S. Applications:

[63] Continuation of Ser. No. 890,757, Mar. 27, 1978, abandoned.

[51] Int. Cl.[3] ..... B60T 11/20

[52] U.S. Cl. ..... 60/562; 60/589; 60/592; 92/171

[58] Field of Search ..... 60/562, 581, 585, 589, 60/592, 588; 92/89, 169, 170, 171

[56] References Cited

U.S. PATENT DOCUMENTS

| | | | |
|---|---|---|---|
| 2,977,767 | 4/1961 | Randol | 92/171 |
| 3,357,183 | 12/1967 | Krieger | 60/562 |
| 3,545,206 | 12/1970 | Belart | 60/588 |
| 3,769,880 | 11/1973 | Mirjanic | 92/169 |
| 3,946,563 | 3/1976 | Rivetti | 60/562 |
| 4,091,619 | 5/1978 | Carre | 60/562 |

FOREIGN PATENT DOCUMENTS

| | | | |
|---|---|---|---|
| 2460344 | 6/1976 | Fed. Rep. of Germany | 60/585 |
| 2624088 | 12/1976 | Fed. Rep. of Germany | 60/562 |

*Primary Examiner*—Abraham Hershkovitz
*Attorney, Agent, or Firm*—Leo H. McCormick, Jr.; Ken C. Decker

[57] ABSTRACT

A master cylinder has a housing with a bore therein having a tapered section located between first and second compensator ports connecting the bore to a reservoir. A sleeve locates first and second lip seals adjacent the first and second compensator ports, respectively. A first piston engages the first lip seal and a second piston engages the second lip seal to define first and second chambers within the bore. A bearing member which surrounds the first piston engages the sleeve and holds the first and second lip seals in a stationary position within the bore. Thereafter, an input member moves the first and second pistons past the first and second lip seals to pressurize the fluid in the first and second chambers and provides fluid pressure responsive devices with an operational input through first and second outlet ports in the housing.

31 Claims, 5 Drawing Figures

MASTER CYLINDER

Matter enclosed in heavy brackets [ ] appears in the original patent but forms no part of this reissue specification; matter printed in italics indicates the additions made by reissue.

This is a *Reissue of U.S. Pat. No. 4,249,381, which is a* continuation of application Ser. No. 890,757, filed Mar. 27, 1978, now abandoned.

BACKGROUND OF THE INVENTION

The manufacture of master cylinders is usually achieved through either sand or permanent mold casing of molten metal to a particular shape. When the molten metal has cooled the sand or core is removed from any cavities therein. As the molten metal cools, a uniform dense surface is created on the periphery of the casting; however, some voids may occur internally. Thereafter when the casting is machined to its final tolerance, such as the master cylinder housing disclosed in U.S. Pat. No. 3,701,257, it is possible that some of the voids may be exposed in the pressurizing chambers. If a master cylinder were assembled having a void exposed in the bore, in addition to providing a possible leak path for the high pressure fluid in the pressurizing chamber, it is possible to damage the seals as they are moved past such voids. Thus once a void is exposed in the bore through machining for safety, the master cylinder casting is automatically scrapped. It is estimated that between 2 and 5 percent of the castings manufactured during any given period of time are scrapped because of the potential hazards created by the exposure of voids during machining.

It has been observed that die casting, when compared with sand or permanent mold castings, produces a smoother surface finish with thinner dimensions and closer manufacturing tolerances.

SUMMARY OF THE INVENTION

I have devised a master cylinder having a die cast housing with a piston arrangement therein which eliminates the need for machining the operational bore and thereby reduces the scrap rate and machining cost in the manufacturing of a master cylinder.

The master cylinder housing has a sleeve which locates first and second lip seals adjacent the first and second compensator ports to establish an effective operational diameter of the bore. A first piston engages the first lip seal and a second piston engages the second lip seal to establish first and second chambers within the bore. A bearing member which surrounds the first piston engages the sleeve and holds the first and second lip seals in substantially a stationary position. An input force applied to the first piston moves the first and [secnd] *second* pistons past the first and second lip seals, respectively, to seal the first and second chambers from the reservoir and allow pressurized fluid to be communicated to a fluid pressure responsive device.

When the input force terminates, a return spring arrangement moves the first and second pistons toward a rest position to allow free communication between the first and second chambers through the compensator port to the reservoir. To assure such free communication, the first and second lip seals have a plurality of grooves on the external surfaces thereof and the first and second pistons have a corresponding plurality of fluted surfaces to establish a positive flow path through which fluid is communicated to the first and second chambers.

It is therefore an object of this invention to provide a master cylinder having a die cast surface with a piston arrangement to pressurize the fluid therein in response to an operator input force.

It is a further object to provide a master cylinder having a tapered operational bore therein with a piston arrangement through which fluid is pressurized and supplied to a fluid pressure responsive device.

These and other objects should be apparent from reading this specification and viewing the drawings.

DETAILED DESCRIPTION OF THE INVENTION

Figure 1:
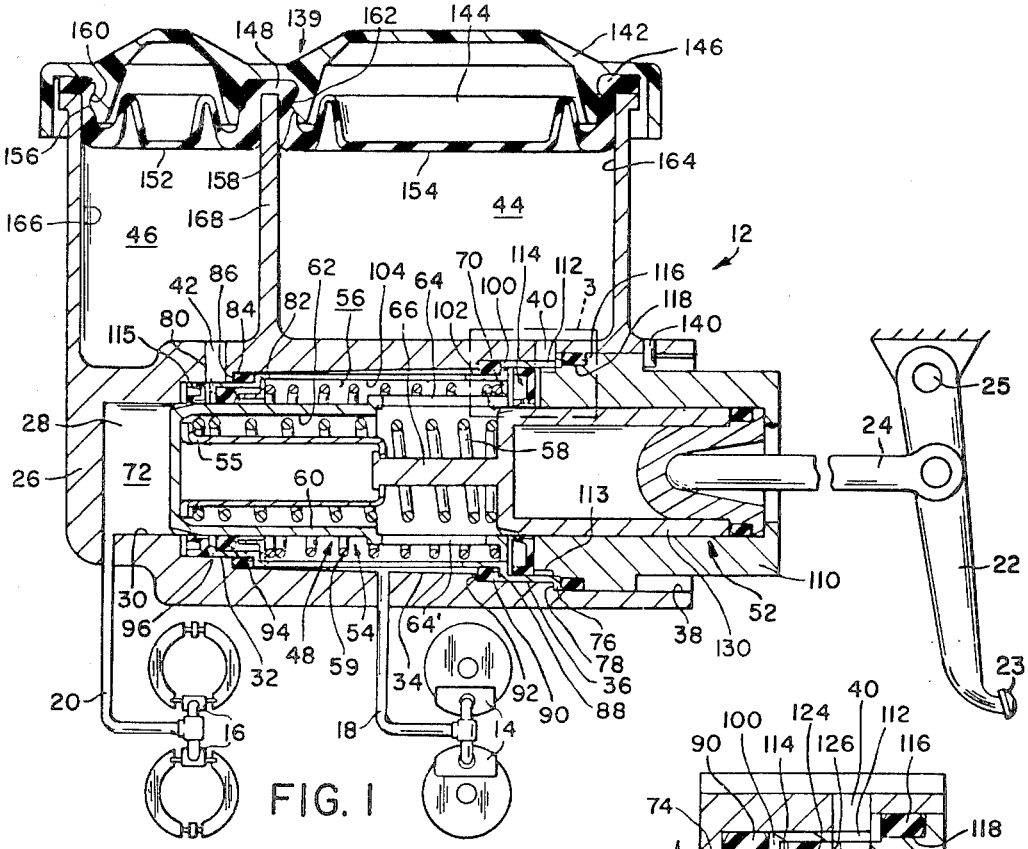
FIG. 1 is a schematic illustration of a brake system having a sectional view of a master cylinder made according to the principles of this invention.

In the brake system 10 shown in FIG. 1, a master cylinder 12 is connected to the front wheel brakes 14 and the rear wheel brakes 16 by conduits 18 and 20, respectively. In response to an operational input applied from brake pedal 22 through push rod 24, the master cylinder 12 is operated to effect a brake application.

In more particular detail, the master cylinder 12 has a die cast housing 26 with a bore 28 located therein. Bore 28 has a series of steps 30, 32, 34, 36 and 38 which have a slope or taper of about 1° with respect to an axial plane through bore 28. Such a slope or taper is placed in the housing during die casting and is necessary to permit the removal of a die cast core after the metal in the housing 26 has cooled from a molten condition. The housing 26 has a first compensator port 40 and a second compensator port 42 through which bore 28 is connected with compartments 44 and 46, respectively, in the fluid reservoir.

Figure 2:
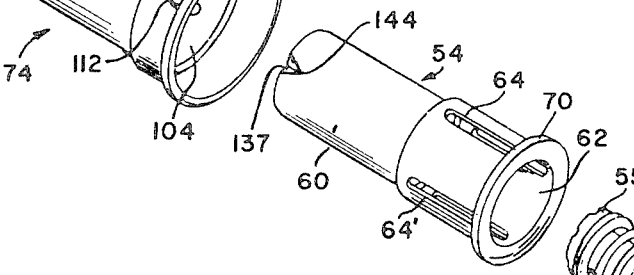
FIG. 2 is an exploded perspective view of the piston assembly of the master cylinder of FIG. 1.
Figure 2:
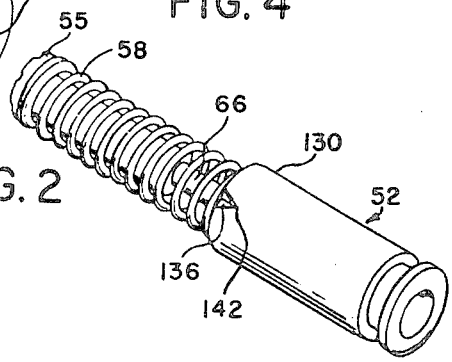

A piston assembly 48 which is located in bore 28 has a first piston 52 and a second piston 54. As shown in FIG. 2, the second piston 54 has a cylindrical body 60 with a first diameter and a second diameter. The cylindrical body 60 has a bore 62 which extends through the first diameter and into the second diameter. A series of openings 64, 64', etc., connect the bore 62 with bore 28. A retainer 55 located in bore 62 has a stem 66 attached to piston 52 for caging spring 58 and thereby initially establish a distance between pistons 52 and 54 to establish the size of a first pressure chamber 56 in bore 28.

Piston 54 has an outwardly projecting lip 70 which engages one end of spring 59 to hold the second piston 54 away from the bottom of bore 28 and establish the size of a second pressurizing chamber 72.

A sleeve member 74 has a first end 76 that engages shoulder 78 to locate a second end 80 adjacent compensator port 42 and a lip seal 115 in step 32 of bore 28 to control communication of fluid between chambers 46 and 72. Sleeve member 74 has a shoulder 82 that locates O-ring seal 84 against shoulder 86 to prevent fluid communication from chamber 56 between steps 32 and 34 of bore 28 and a shoulder 88 that positions O-ring seal 90 against shoulder 92 to prevent fluid communication from chamber 56 between steps 34 and 36.

Similarly, an O-ring seal 94 located adjacent rib 96 of the sleeve member 74 by spring retainer 98, engages the cylindrical body 60 of piston 54 to prevent fluid communication between chambers 56 and 72.

As illustrated in FIGS. 1 and 2, sleeve member 74 has a leg 100 that aligns its cylindrical body 102 within bore 28 to compensate for the taper or slope in step 34 between the first and second compensator ports 40 and 42. Lip 70 engages the interior surface 104 and cylindrical body 102 engages bearing surface 106 of rib 96 to align or centrally position piston 54 in step 32 of bore 28.

A bearing member 110 which surrounds the cylindrical body of piston 52 engages end 76 of sleeve 74 to position a lip seal 114 adjacent leg 100 and align passages 112 with compensator port 40 and groove 113 in bearing 110. A seal 116 located in groove 118 of the bearng member 110 prevents fluid communication from compensator port 40 to the surrounding environment along step 38 of bore 28.

A snap ring or other fastener 140 engages bearing member 110 to hold the piston assembly 48 within the bore 28.

Figure 3:
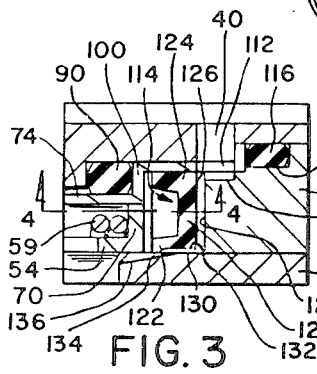
FIG. 3 is a sectional view of circumscribed line 3 of FIG. 1 showing the relationship between the sleeve, lip seal, primary piston and bearing member of the piston assembly in a released position.
Figure 4:
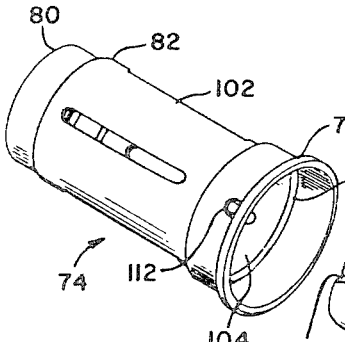
FIG. 4 is a sectional view taken along line 4—4 of FIG. 3.
Figure 4:
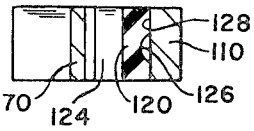

To assure that bore 28 is communicated with the reservoir, lip seals 114 and 115 and pistons 52 and 54 cooperate to define positive flow paths, as shown in FIGS. 3 and 4, between chamber 56 and compartment 42 and chamber 72 and compartment 46, respectively.

Lip seals 114 and 115 are identical with exception of size and thus the specific detail shown with respect to lip seal 114 in FIGS. 3 and 4 are equally applicable to lip seal 115.

Lip seal 114 has an annular base 120 with legs 122 and 124 attached thereto. A series of radial grooves 126, only one being shown in FIGS. 3 and 4, which are located on the back side 128 of the base 120 provide a flow path from groove 113 in bearing 110 to the cylindrical surface 130 of piston 52. A groove 132 on the peripheral surface 134 of leg 122 connects the radial grooves 126 with a series of fluted grooves 136 on the end of the cylindrical surface 130 to define a positive flow path between compartment 44 into chamber 56 to maintain the fluid therein in completely filled condition.

A cover member [140] *139* having a cap 142 and a diaphragm 144 is attached to housing [260] *26*. The diaphragm 144 has a first bead 146 on its peripheral surface and a second bead 148 which separates the diaphragm 144 into two sections, 152 and 154. A first groove 156 is located in the first section 152 and a second groove 158 is located in the second section 154. The cap 142 has ribs 160 and 162 thereon which are located in grooves 156 and 158 to resiliently bias the diaphragm 144 toward walls 164, 166 and 168 and attach the cover member [140] *139* to the housing 26 and thereby seal compartment 44 and 46 from the surrounding environment.

MODE OF OPERATION OF THE INVENTION

When an operator desires to make a brake application in a vehicle equipped with a brake system as shown in FIG. 1, an input force applied to pad 23 causes pedal 22 to move in an arc about pin 25 and provide push rod 24 with a linear input. This linear input simultaneously moves the fluted grooves 136 and 137 on pistons 52 and 54 past grooves 132 and 133 as return spring 59 is overcome to interrupt communication between chambers 56 and 72 and compartments 44 and 46, respectively. Movement of pistons 52 and 54 into chambers 56 and 72 causes a fluid pressure to proportionally increase therein and supply wheel brakes 14 and 16 with fluid pressure to effect a brake application.

Figure 5:
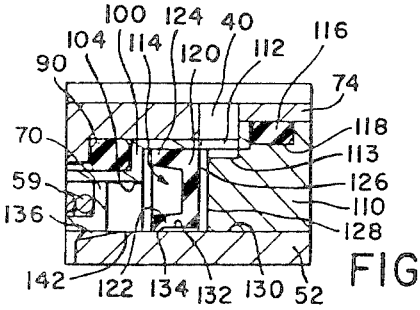
FIG. 5 is a sectional view of circumscribed line 3 of FIG. 1 showing the relationship between the sleeve, lip seal, primary piston and bearing member of the piston assembly in an operational position.

As shown in FIG. 5, the lip seal 114 remains stationary as piston 52 moves into chamber 56 to pressurize the fluid therein. The fluid pressure in chamber 56 acts on lip seal 114 to hold leg 124 against sleeve 74, surface 128 against bearing 110 and surface 134 of leg 122 against the cylindrical surface 130 of piston 52 to prevent fluid communication to compartment 44 of the reservoir.

Upon termination of the input force on pedal 22, return spring 59 acts on the second piston 54 and moves the first and second pistons 52 and 54 toward stop 140. As tips 142 and 144 of fluted grooves 136 and 137 reach grooves 132 and 133, fluid communication between chambers 56 and 72 and reservoir compartment 44 and 46 is initiated through a defined flow path established by grooves 126 to assure that any fluid which could be lost from the brake system is replenished prior to another application of input brake force by an operator.

I claim:

[1. A master cylinder comprising:

a housing having a tapered bore therein, said housing having first and second compensator ports for connecting said tapered bore to a fluid reservoir and first and second outlet ports connected to fluid pressure responsive devices;

a sleeve member located in said tapered bore having a plurality of openings through which fluid is communicated to said first outlet port;

first and second seals associated with said sleeve member having a plurality of radial grooves for establishing a definite flow path between the reservoir and the tapered bore;

bearing means engaging said sleeve member to hold said first and second seals in a stationary position within said bore;

piston means having a first cylindrical member located in said tapered bore by said bearing means, and a second cylindrical member located in said tapered bore by a lip on said sleeve member, said first and second cylindrical members engaging said first and second seals, respectively, and cooperating with said housing to define first and second chambers adjacent said first and second outlet ports respectively, each having a fluted section located on the end of said first and second cylindrical members for defining an extension between said definite flow path and the first and second chambers, said second cylindrical member having a first diameter section and a second diameter section, said first diameter section having a lip on the peripheral surface thereof for engaging said sleeve member to hold the second diameter section in substantially the center of said bore in said second chamber;

a first spring located between said first and second cylindrical members to establish the size of said first chamber;

a second spring located between said lip on the first cylindrical member and said sleeve member for urging said first and second cylindrical members out of said first and second chambers toward a rest position; and input means responsive to an input force for moving said piston means past said seals to interrupt communication between the reservoir and the bore and pressurizing the fluid in said first and second chambers to supply the fluid pressure responsive devices with an operational fluid pressure through said first and second outlet ports.]

2. The master cylinder, as recited in claim [1] *32*, wherein said second cylindrical body further includes:

a plurality of openings located in said first diameter section to allow fluid to freely flow between the tapered bore and the first chamber with relative movement between the first and second cylindrical members.

3. The master cylinder, as recited in claim [1] *32*, further including:

a wall for separating the reservoir into first and second compartments;

a diaphragm having a first bead on its peripheral surface and a second bead, said first and second beads having grooves thereon; and cover means having first and second ribs thereon located in said grooves for biasing said first and second beads against said housing and wall to seal said first and second chambers from the surrounding environment.

4. The master cylinder, as recited in claim [1] *32*, wherein said second cylindrical body further includes:

a second bore that extends through said first diameter section and into said second diameter section, said first spring being located in said bore and said first cylindrical member telescoping into said second bore to provide a compact unitary structure.

5. The master cylinder, as recited in claim 4, wherein said second cylindrical body further includes:

a plurality of openings located in said first diameter section to allow fluid to freely flow between the second bore and the first chamber with relative movement between the first and second cylinder members.

6. The master cylinder, as recited in claim 5, further including:

a wall for separating the reservoir into first and second compartments;

a diaphragm having a first bead on its peripheral surface and a second bead, said first and second beads having grooves thereon; and cover means having first and second ribs thereon located in said grooves for biasing said first and second beads against said housing and wall to seal said first and second chambers from the surrounding environment.

7. A master cylinder comprising:

a housing having a tapered bore therein, said housing having first and second compensator ports for connecting said tapered bore to a fluid reservoir and first and second outlet ports connected to fluid pressure responsive devices;

a sleeve located in said tapered bore;

first and second seals located in said tapered bore, said first and second seals each having a plurality of radial grooves for establishing definite flow paths between the first and second compensator ports and the tapered bore, *said sleeve holding said second seal in a stationary position*;

bearing means located in said tapered bore for holding said first [and second seals] *seal* in a stationary position;

piston means having first and second cylindrical members located in said tapered bore by said bearing means and [engaging] said first and second seals, respectively, to define first and second chambers in said tapered bore adjacent said first and second outlet ports, each of said first and second cylindrical members having a [fluted] section located on the end thereof for defining an extension between said definite flow path and the first and second chambers, [said second cylindrical member having a first diameter section and a second diameter section, said first diameter section having a lip on the peripheral surface thereof for engaging] said sleeve [to hold] *holding* said second [diameter section] *cylindrical member* in the axial center of the tapered bore in the second chamber; and input means responsive to an input force for moving the first and second cylindrical members past said first and second seals to interrupt communication between the reservoir and the tapered bore through said definite flow paths and extension thereof to allow further movement of the first and second cylindrical members to pressurize the fluid in the first and second chambers and thereby supply the fluid pressure responsive devices with operational fluid through said first and second outlet ports.

8. The master cylinder, as recited in claim 7 further including:

a first spring located between said first and second cylindrical members to establish the size of said first chambers; and a second spring located between [said] *a* lip on the first cylindrical member and said sleeve member for urging said first and second cylindrical members out of said first and second chambers toward a rest position.

9. The master cylinder, as recited in claim 8 wherein said second cylindrical body further includes:

a second bore that extends through [said] *a* first diameter section and into [said] *a* second diameter section, said first spring being located in said second bore and said first cylindrical member telescoping into said second bore to provide a compact unitary structure.

10. The master cylinder, as recited in claim 9 wherein said second cylindrical body further includes:

a plurality of openings located in said first diameter section to allow fluid to freely flow between the second bore and the first chamber with relative movement between the first and second cylindrical members.

11. The master cylinder, as recited in claim 7 wherein said sleeve [member] includes:

a plurality of openings through which fluid is communicated to said first outlet port.

12. The master cylinder, as recited in claim 7 wherein said first cylindrical member telescopes into said second cylindrical member to provide a compact unitary structure.

[13. A master cylinder comprising:

a housing having a tapered bore therein, said housing having first and second compensator ports for connecting said tapered bore to a reservoir and first and second outlet ports;

a sleeve located in said tapered bore;

first and second seals positioned in said tapered bore adjacent said first and second compensator ports, each of the first and second seals having a radial groove therein for defining a definite flow path between the compensator ports and the tapered bore;

bearing means engaging said sleeve to hold said first and second seals in a stationary position within said bore;

piston means having first and second cylindrical members located in said sleeve and engaging said first and second seals to define first and second chambers in the tapered bore, said second cylindrical member having a first diameter section and a second diameter section, said first diameter section engaging said sleeve to hold said second diameter section in the axial center of the tapered bore in the second chamber; and input means responsive to an input force for moving the first and second cylindrical members past said first and second seals to interrupt communication between the reservoir and the tapered bore through said definite flow paths to allow further movement of the first and second cylindrical members to pressurize the fluid in the first and second chambers and thereby supply the fluid pressure responsive devices with operational fluid through said first and second outlet ports.]

14. The master cylinder, as recited in claim [13] *33* further including:

a first spring located between said first and second cylindrical members to establish the size of said first chamber; and a second spring located between said sleeve member and [the first diameter section of] said second cylindrical member for urging said first and second *cylindrical* members out of the first and second chambers toward a rest position.

15. The master cylinder, as recited in claim 14 wherein said first and second cylindrical members each include:

a fluted section located on the end of said first and second cylindrical members for defining an extension between said definite flow path and the first and second chambers.

16. The master cylinder as recited in claim 15 wherein said second cylindrical member further includes:

a [second] *blind* bore that extends through [said] *a* first diameter section and into [said] *a* second diameter section, said first spring being located in said [second] *blind* bore and said first cylindrical member telescoping into said [second] *blind* bore to provide a compact unitary structure.

17. The master cylinder, as recited in claim 16 wherein said second cylindrical body further includes:

a plurality of openings located in said first diameter section to allow fluid to freely flow between the [second] *blind* bore and the first chamber with relative movement between the first and second cylindrical members.

18. A master cylinder comprising:

a housing having a stepped bore therein, said housing having first and second inlet ports for connecting said stepped bore to a reservoir and first and second outlet ports;

[a] sleeve *means* located in said stepped bore;

first and second seals positioned in said stepped bore adjacent said first and second inlet ports;

bearing means [engaging] *cooperating with* said sleeve *means* to hold said first and second seals in a stationary position within said stepped bore;

passage means between said first [and second seals] *seal* and bearing means *and said second seal and sleeve means* for defining definite flow paths between the first and second inlet ports and the stepped bore;

piston means having first and second cylindrical members located in said sleeve *means* and engaging said first and second seals to define first and second chambers in the stepped bore, [said second cylindrical member having a first diameter section and a second diameter section, said first diameter section engaging] said sleeve [to hold] *means holding* said second [diameter section] *cylindrical member* in substantially the axial center of the stepped bore in the second chamber; and input means responsive to an input force for moving the first and second cylindrical members past said first and second seals to interrupt communication between the reservoir and the stepped bore through said definite flow paths to allow further movement of the first and second cylindrical members to pressurize the fluid in the first and second chambers and thereby supply the fluid pressure responsive devices with operational fluid through said first and second outlet ports.

19. The master cylinder, as recited in claim 18 further including:

a first spring located between said first and second cylindrical member to establish the size of said first chamber; and a second spring located between said sleeve member and [the first diameter section of] said second cylindrical member for urging said first and second members out of the first and second chambers toward a rest position.

20. The master cylinder, as recited in claim 19 wherein said first and second cylindrical members each include:

a fluted section located on the end of said first and second cylindrical members for defining an extension between said definite flow path and the first and second chambers.

21. The master cylinder as recited in claim 20 wherein said second cylindrical member further includes:

a [second] *blind* bore that extends [through said] *from a* first diameter section and into [said] *a* second diameter section, said first spring being located in said [second] *blind* bore and said first cylindrical member telescoping into said [second] *blind* bore to provide a compact unitary structure.

22. The master cylinder, as recited in claim 21 wherein said second cylindrical body further includes:

a plurality of openings located in said first diameter section to allow fluid to freely flow between the second bore and the first chamber with relative movement between the first and second cylindrical members.

*23. A master cylinder comprising:*

*a housing having a bore therein, said housing having first and second inlet ports for connecting said bore to a reservoir and first and second outlet ports;*

*first and second pistons located in said bore to define first and second chambers;*

*first and second seals located in said bore for engaging said first and second pistons, respectively;*

*a sleeve located in said bore between said first and second seals for guiding said first piston in said bore;*

*a bearing member for guiding said second piston in said bore, said bearing member fixedly positioning said sleeve in said bore and the first seal between a shoulder in the bore and a first end of the sleeve and the second seal between a shoulder on the sleeve and a first end of the bearing member,*

*said first seal having grooves located adjacent said first end of said sleeve and said second seal having grooves located adjacent said first end of said bearing member, to establish a definite flow path between the reservoir and said first and second chambers through said first and second ports, respectively; and*

*an input member responsive to an input force for moving said first and second piston with respect to said first and second seals to pressurize fluid in said first and second chamber for distribution to said first and second outlet ports.*

*24. The master cylinder, as recited in claim 23 wherein, said sleeve means includes:*

*a plurality of openings through which fluid in said second chamber is communicated to said second outlet port.*

*25. The master cylinder, as recited in claim 23, wherein said first and second pistons each include a fluted section on the end thereof, said fluted section providing an extension for said definite flow path to assure free communication between the reservoir and first and second chambers in the absence of an input force on said input member.*

*26. A master cylinder comprising:*

*a housing having a bore therein, said housing having first and second inlet ports for communicating said bore with a reservoir and first and second outlet ports;*

*a first seal located in said bore;*

*a first piston having a first cylindrical body located in said bore and engaging said first seal, said first cylindrical body having a first end and a second end, said first cylindrical body having an outwardly projecting lip adjacent said first end, a blind bore extending from said first end toward said second end and a plurality of substantially radial openings extending from the blind bore through said first cylindrical body;*

*sleeve means having a cylindrical member with a first end and a second end, said sleeve means being restrained in said bore, said first end engaging said first seal to substantially fix the position of said first seal within said bore, said first seal, first piston and housing defining a first chamber within said bore, said first chamber communicating with said first inlet port via a first passage between said first seal, said sleeve means and said second end of said cylindrical body to allow fluid in said reservoir to flow into said first chamber, said first chamber communicating with said first outlet port, said cylindrical member having a bearing surface that contacts said first piston to hold the first piston to hold the first piston in substantially the axial center of said first chamber and a shoulder adjacent a second end;*

*a second seal that engages said shoulder adjacent said second end of the cylindrical member of said sleeve means to substantially fix its position within said bore;*

*a second piston having a second cylindrical body located in said bore and engaging said second seal, said second cylindrical body having a first end and a second end, said first end extending into said blind bore of said first piston, said first piston, first seal, housing, second seal, and second piston defining a second chamber within said bore, said second chamber communicating with said second inlet via a second passage between said second end of said cylindrical body and said second seal to allow fluid in said reservoir to flow into said second chamber, said blind bore communicating with said second chamber through said plurality of openings in said first piston, said second chamber communicating with said second outlet port; and*

*an input member responsive to an input signal for moving said first and second pistons with respect to said first and second seals to interrupt fluid communication between said reservoir and said first and second chambers and thereafter pressurizing the fluid in the first and second chambers for providing said first and second outlet ports with pressurized fluid.*

*27. The master cylinder, as recited in claim 26 wherein said master cylinder further includes:*

*a first spring located between said first end of said sleeve and said lip on said first cylindrical body for returning said first piston to a first rest position in the absence of an input signal on said input member.*

*28. The master cylinder, as recited in claim 27 wherein said master cylinder further includes:*

*a second spring located in said blind bore of said first cylindrical body for urging said second piston to a second rest position in the absence of an input signal on said input member.*

*29. A master cylinder comprising:*

*a housing having a bore therein, said housing having first and second inlet ports for connecting said bore to a reservoir and first and second outlet ports;*

*first and second seals located in said bore adjacent said first and second inlet ports respectively;*

*a sleeve located in said bore for substantially defining fixed positions for said first and second seals;*

*a first piston located in said bore and engaging said first seal to substantially define a first chamber, said first piston having a first end and a second end, said first chamber being connected to said first outlet port;*

*a second piston located in said bore and engaging said second seal to substantially define a second chamber, said second piston having a first end and a second end, said second chamber being connected to said second outlet port;*

*a first passage located between said first end of said first piston and said first seal;*

*a second passage located between said first end of said second piston and said second seal;*

*retainer means for holding said second piston in said bore;*

*spring means for urging said first and second pistons toward said retainer means to allow substantially unrestricted fluid communication between said reservoir and said first and second chambers through said first and second passages, respectively; and*

*input means responsive to an input force for moving said first and second pistons to terminate fluid communication through said first and second passages and thereafter generate fluid pressure in said first and second chamber for distribution to said first and second outlet ports.*

*30. The master cylinder, as recited in claim 29 wherein said first piston includes:*

*a blind bore that extends from said second end toward said first end, said blind bore receiving at least a portion of said second piston; and*

*a radial outward flange adjacent said second end.*

*31. The master cylinder, as recited in claim 30 wherein said spring means includes:*

*a first spring located between said sleeve and said radial flange for urging said first end of said first piston toward said first seal whereby fluid communication is established through said first passage; and*

*a second spring located in said blind bore for urging said first end of said second piston toward said second seal whereby fluid communication is established through said second passage.*

*32. A master cylinder comprising:*

*a housing having a tapered bore therein, said housing having first and second compensator ports for connecting said tapered bore to a fluid reservoir and first and second outlet ports connected to fluid pressure responsive devices;*

*a sleeve member located in said tapered bore having a plurality of openings through which fluid is communicated to said first outlet port;*

*first and second seals associated with said sleeve member;*

*bearing means engaging said sleeve member, said bearing means and sleeve member holding said first and second seals in a substantially stationary position within said bore while defining flow paths from the reservoir into said tapered bore;*

*piston means having a first cylindrical member located in said tapered bore by said bearing means and a second cylindrical member being located in said tapered bore by a lip on said sleeve member, said first and second cylindrical members engaging said first and second seals, respectively, and cooperating with said housing to define first and second chambers adjacent said first and second outlet ports, respectively, each of said first and second cylindrical members having a fluted section located on the end thereof for defining an extension for said flow paths to allow fluid communication to the first and second chambers, said second cylindrical member having a first diameter section and a second diameter section, said first diameter section having a lip on the peripheral surface thereof for engaging said sleeve member to hold the second diameter section in substantially the center of said bore in said second chamber;*

*a first spring located between said first and second cylindrical members to establish the size of said first chamber;*

*a second spring located between said first cylindrical member and said sleeve member for urging said first and second cylindrical members out of said first and second chambers toward a rest position; and*

*input means responsive to an input force for moving said piston means past said seals to interrupt communication between the reservoir and the bore and pressurizing the fluid in said first and second chambers to supply the fluid pressure responsive devices with an operational fluid pressure through said first and second outlet ports.*

*33. A master cylinder comprising:*

*a housing having a tapered bore therein, said housing having first and second compensator ports for connecting said tapered bore to a reservoir and first and second outlet ports;*

*a sleeve located in said tapered bore;*

*first and second seals positioned in said tapered bore adjacent said first and second compensator ports;*

*bearing means cooperating with said sleeve to hold said first and second seals in a substantially stationary position within said bore and to define flow paths adjacent each of said first and second seals to connect the compensator ports with the tapered bore;*

*piston means having first and second cylindrical members located in said sleeve and engaging said first and second seals to define first and second chambers in the tapered bore, said sleeve holding said second cylindrical member in the axial center of the tapered bore in the second chamber; and*

*input means responsive to an input force for moving the first and second cylindrical members past said first and second seals to interrupt communication between the reservoir and the tapered bore through said definite flow paths to allow further movement of the first and second cylindrical members to pressurize the fluid in the first and second chambers and thereby supply the fluid pressure responsive devices with operational fluid through said first and second outlet ports.*

* * * * *